(12) United States Patent
Kwon et al.

(10) Patent No.: US 8,804,227 B2
(45) Date of Patent: Aug. 12, 2014

(54) ELECTROPHORETIC DISPLAY DEVICE AND METHOD FOR FABRICATING THE SAME

(75) Inventors: Oh-Nam Kwon, Gyeonggi-Do (KR); Yong-In Park, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 389 days.

(21) Appl. No.: 12/964,801

(22) Filed: Dec. 10, 2010

(65) Prior Publication Data
US 2011/0157681 A1  Jun. 30, 2011

(30) Foreign Application Priority Data
Dec. 24, 2009 (KR) .................. 10-2009-0131155

(51) Int. Cl.
*G02F 1/167* (2006.01)
(52) U.S. Cl.
CPC ........ *G02F 1/167* (2013.01); *G02F 2001/1676* (2013.01)
USPC ........................................ 359/296
(58) Field of Classification Search
CPC .................. G02F 1/167; G02F 2001/1676
USPC ........................................ 359/296
See application file for complete search history.

(56) References Cited

U.S. PATENT DOCUMENTS

| | | | |
|---|---|---|---|
| 6,862,129 B2 * | 3/2005 | Matsuda et al. | 359/296 |
| 7,408,697 B2 * | 8/2008 | Kawai | 359/296 |
| 7,551,345 B2 * | 6/2009 | Uchida | 359/296 |
| 7,605,972 B2 * | 10/2009 | Kawai et al. | 359/296 |
| 7,663,799 B2 * | 2/2010 | Matsuda et al. | 359/296 |
| 2002/0033792 A1 | 3/2002 | Inoue | |
| 2008/0174851 A1 | 7/2008 | Kawai | |
| 2009/0224246 A1 * | 9/2009 | Hwang et al. | 257/59 |

FOREIGN PATENT DOCUMENTS

CN    1345026 A    4/2002
CN    101201525 A    6/2008

OTHER PUBLICATIONS

First Notification of Office Action dated Feb. 6, 2013 from the State Intellectual Property Office of China in counterpart Chinese Application No. 201010594264.6.

* cited by examiner

Primary Examiner — Zachary Wilkes
(74) Attorney, Agent, or Firm — Morgan, Lewis & Bockius LLP

(57) ABSTRACT

Disclosed is an electrophoretic display device and a fabrication method thereof, and the electrophoretic display device may include a thin-film transistor formed on a lower substrate, a pixel electrode connected to the thin-film transistor, side electrodes formed at periphery of the pixel electrode, a partition wall formed on the side electrode, fluid including an electrophoretic particles formed between the partition walls, and an upper substrate adhered on the lower substrate and formed with a common electrode on the rear surface thereof.

16 Claims, 6 Drawing Sheets

ELECTROPHORETIC DISPLAY DEVICE AND METHOD FOR FABRICATING THE SAME

CROSS-REFERENCE TO RELATED APPLICATIONS

Pursuant to 35 U.S.C. §119(a), this application claims the benefit of earlier filing date and right of priority to Korean Application No. 10-2009-131155 filed on Dec. 24, 2009, the contents of which are incorporated by reference herein in its entirety.

BACKGROUND OF THE INVENTION

1. Field of the Invention

The present invention relates to an electrophoretic display device (EPD), and more particularly, to an electrophoretic display device suitable for a color EPD and a method of fabricating the same.

2. Description of the Related Art

In general, an electrophoretic display device is an image display device using a phenomenon that colloidal particles move to either one of the polarities when one pair of electrodes to which a voltage is applied are immersed into a colloidal solution. The electrophoretic display device has the characteristics of wide viewing angle, high reflectivity, low power consumption, and the like, without using a backlight and thus it may be expected to be widely used as an electronic paper.

The electrophoretic display device has a structure in which an electrophoretic film is interposed between two substrates, and at least one of the two substrates should be transparent to display an image in a reflective mode.

When a pixel electrode is formed on a lower substrate of the two substrates and a voltage is applied to the pixel electrode, charged particles within the electrophoretic film are moved to the pixel electrode or an opposite electrode thereof, thereby allowing an image to be observed through a viewing sheet.

Though not shown in the drawing, a typical electrophoretic display device has a structure in which an upper substrate having common electrode (not shown) and a lower substrate formed with pixel electrodes are disposed by facing each other, and an electrophoretic film is interposed between the two substrates.

Here, the electrophoretic film is composed of a solvent containing charged pigment particles, wherein microcapsules are formed by a coacervation method, and the electrophoretic film is formed by mixing the microcapsules in a binder and coating or laminating a base film.

Here, the pigment particles may be colored with different colors, and an image is expressed by adding pigments of black (B) and white (W), and the solvent and binder are formed with a transparent material, allowing light to be passed through.

In the foregoing electrophoretic film, pigment particles are surrounded by a microcapsule film, and thus pigment particles being moved to an undesired direction by a field of the adjacent pixel can be suppressed, thereby achieving a better image quality. At this time, a partition wall may be further provided between adjacent pixels to completely isolate a parasitic field.

In such a typical electrophoretic display device, when a voltage is applied to the pixel electrode, charged pigment particles are moved to an electrode having an opposite polarity thereto, thereby displaying a predetermined image according to the reflection of light caused by the pigment particles. On the other hand, when they are moved to an electrode having a polarity charged by the pigment particles, another image will be displayed.

From this point of view, an electrophoretic display device according to the related art will be described below with reference to FIG. 1.

FIG. 1 is a plan view schematically illustrating an electrophoretic display device according to the related art, wherein one pixel is composed of four sub-pixels such as red (R), green (G), blue (B), and white (W) dots.

An electrophoretic display device according to the related art, as illustrated in FIG. 1, one pixel is composed of four red (R), green (G), blue (B), and white (W) sub-pixels. Furthermore, the red (R), green (G), and blue (B) sub-pixels are provided with red (R), green (G), and blue (B) color filters 65a, 65b, 65c, respectively, and the white sub-pixel is not provided with a color filter but defined as a white sub-pixel region 65d.

Here, each of the red (R), green (G), and blue (B) sub-pixels has a thin-film transistor (not shown), and this thin-film transistor (not shown) is connected to a pixel electrode (not shown) in a matrix form.

Furthermore, the pixel electrodes formed on the red (R), green (G), and blue (B) sub-pixels, respectively, are formed with the same area as the area of the red (R), green (G), and blue (B) sub-pixels.

In the EPD having the foregoing construction, a panel having a quad-type color filter structure to which a white sub-pixel is added has been applied thereto in order to improve the problem of reduced white reflection rate in case of a color EPD that uses color filters.

A method of fabricating an EPD according to the related art in which a panel having a quad-type color filter structure to which a white sub-pixel is added is applied thereto will be described below with reference to FIG. 2.

FIG. 2 is a cross-sectional view schematically illustrating an electrophoretic display device according to the related art, wherein one pixel is composed of four sub-pixels such as red (R), green (G), blue (B), and white (W) dots.

An EPD according to the related art, as illustrated in FIG. 2, is configured by including a lower substrate 11 in which a plurality of thin-film transistors (T) are formed and each of the thin-film transistors (T) is connected to a pixel electrode 29 formed in a matrix form; an electrophoretic film 50 adhered to the lower substrate 11; an upper substrate 61 adhered to the electrophoretic film 50 and a common electrode 63 formed on the surface thereof; and red (R), green (G), and blue (B) color filters 65a, 65b, 65c formed on the upper substrate 61 (Note: referring to FIG. 2, 65d is a white sub-pixel region, rather than a color filter).

Here, a passivation layer 25 is formed on an entire surface of the substrate including thin-film transistors (T) of the lower substrate 11.

In addition, a gate line (not shown) transmitting a scan signal to actively drive a plurality of thin-film transistors (T) and a data line (not shown) transmitting an image data signal are formed on the lower substrate 11.

At this time, the gate and data lines intersect each other to define pixels, and each pixel is provided with a thin-film transistor (T) and a storage capacitor (not shown), thereby performing a role of controlling a polarity of the voltage applied to each electrode and storing potential energy applied to the polarity.

Furthermore, a pixel electrode 29 electrically connected to the thin-film transistors (T) applies an electric field to the electrophoretic film 50.

In addition, the electrophoretic film 50 is composed of microcapsules 53 in which white particles 55a and black particles 55b are mixed with a solvent therewithin.

Furthermore, the red (R), green (G), and blue (B) color filters 65a, 65b, 65c are provided on the upper substrate 61, and the white sub-pixel region is not provided with a color filter but defined as a white sub-pixel region 65d.

However, an electrophoretic display device according to the related art has a problem as follows.

In an electrophoretic display device according to the related art, a panel having a quad-type color filter structure to which a white sub-pixel is added has been used in order to enhance the problem of reduced white reflection rate in case of a color electrophoretic display device that uses color filters. Here, one pixel is composed of four dots, such as the red (R), green (G), blue (B), and white (W) dots, thereby causing the problem of reduced resolution. In particular, a quad-type color electrophoretic display device is formed by a structure having a small color filter area without black matrix, thereby causing a problem of reduced color characteristics.

As a result, in an electrophoretic display device according to the related art, color filters are used to fabricate a color EPD thereby showing a reflection reduction, and a white dot is additionally used to improve the problem thereby causing a resolution reduction.

SUMMARY OF THE INVENTION

The present invention is contrived to solve the aforementioned problem according to the related art, and an object of the invention is to provide an electrophoretic display device and a fabrication method thereof in which the characteristics of a color EPD panel are enhanced to increase the reflectivity without reducing the resolution.

In order to accomplish the foregoing object, an electrophoretic display device according to the present invention is characterized by including thin-film transistors formed in a matrix form on a lower substrate having a pixel region in which are arranged unit pixel regions; a passivation layer covering the lower substrate on which is formed the thin-film transistors; pixel electrodes formed on the passivation layer and connected to the thin-film transistors, respectively; a side electrode formed on the passivation layer and enclosing the pixel electrodes and spaced with the pixel electrodes; a partition wall between the pixel electrodes and dividing the pixel region into the unit pixel region; a fluid including an electrophoretic particles filled between the partition wall; and an upper substrate attached with the lower substrate and formed with a common electrode on a lower surface thereof.

In order to accomplish the foregoing object, a method of fabricating an electrophoretic display device according to the present invention is characterized by including forming thin-film transistors in a matrix form on a lower substrate having a pixel region in which are arranged unit pixel regions; forming a passivation layer covering the thin-film transistors; forming pixel electrodes on the passivation layer and connected to the thin-film transistors, respectively; forming side electrode on the passivation layer and enclosing the pixel electrodes and spaced with the pixel electrodes; forming a partition wall dividing the pixel region into the unit pixel regions and formed at between the pixel electrodes on the passivation layer; filling a fluid including electrophoretic particles between the partition wall; and attaching an upper substrate on the lower substrate, the upper substrate is provided with a common electrode on a lower surface thereof.

According to an EPD and a fabrication method thereof in accordance with the present invention has an effect as follows.

According to an electrophoretic display device and a fabrication method thereof, charged color particles and a fluid are injected into a cell region in the partition wall, and then the upper portion thereof is encapsulated to fabricate an electrophoretic display device.

Furthermore, according to an electrophoretic display device and a fabrication method thereof, a partition wall is formed on a thin-film transistor, and negatively charged color particles and positively charged black particles are injected into red, green, blue cells, respectively, using an inkjet or other methods, and then in-capsulated on an upper substrate formed with a transparent common electrode while at the same time injecting a suitable amount of dropping fluid in a state that a relative electric field is applied to the side electrode and pixel electrode to prevent mixed color.

In addition, according to an electrophoretic display device and a fabrication method thereof, color drive is possible through a vertical drive by the common electrode formed on the upper substrate in-capsulated with a pixel electrode of the thin-film transistor.

As a result, according to an electrophoretic display device and a fabrication method thereof, it is expected to preoccupy the color EPD technology and market by securing the technology of fabricating a light-weight, thin-profile color EPD panel, which has the characteristics of color EPD panel and cost competitiveness.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, a electrophoretic display device according to a preferred embodiment of the present invention will be described in detail with reference to the accompanying drawings.

Figure 1:
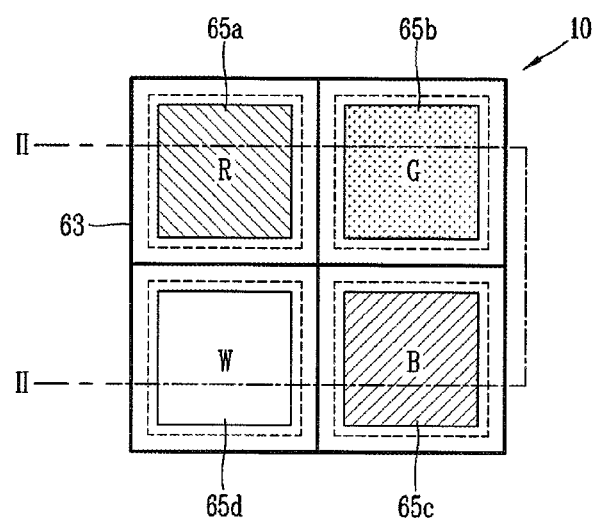
FIG. 1 is a plan view schematically illustrating an electrophoretic display device according to the related art, wherein one pixel is composed of four sub-pixels such as red (R), green (G), blue (B), and white (W) dots.
Figure 2:
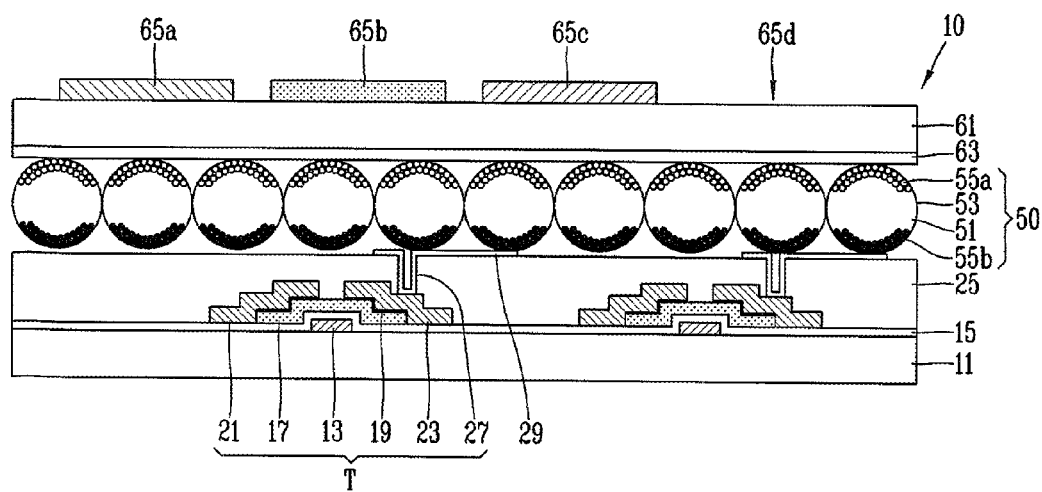
FIG. 2 is a cross-sectional view schematically illustrating an electrophoretic display device according to the related art, wherein one pixel is composed of four sub-pixels such as red (R), green (G), blue (B), and white (W) dots.
Figure 3:
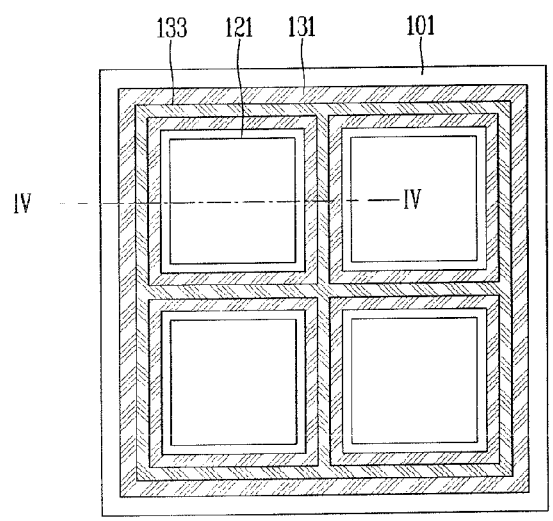
FIG. 3 is a plan view schematically illustrating an electrophoretic display device according to the present invention.

FIG. 3 is a plan view schematically illustrating an electrophoretic display device according to the present invention.

An electrophoretic display device according to the present invention, as illustrated in FIG. 3, one pixel is composed of four sub-pixels. Here, each of the sub-pixels has a thin-film transistor (not shown), and this thin-film transistor (not shown) is connected to a pixel electrode (121) in a matrix form.

Figure 4:
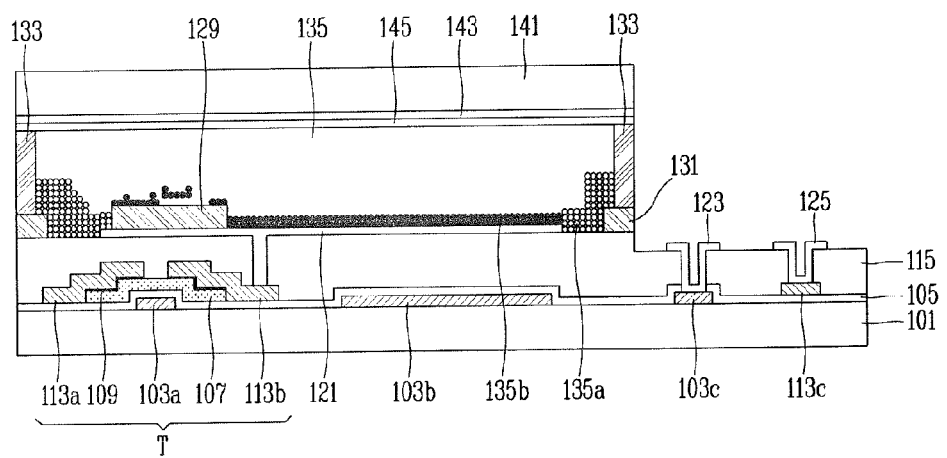
FIG. 4 is a cross-sectional view schematically illustrating an electrophoretic display device according to the present invention.

FIG. 4 is a cross-sectional view schematically illustrating an electrophoretic display device according to the present invention.

An electrophoretic display device according to the present invention, as illustrated in FIG. 4, may include a thin-film transistor (T) formed on a lower substrate 101; a pixel electrode 121 connected to the thin-film transistor (T); a light blocking pattern 129 protecting the thin-film transistor from the light irradiated from the outside and formed on the pixel electrode 121 of the lower substrate 101; side electrodes 131 formed at a periphery of the pixel electrode 121; a partition wall 133 formed on the side electrode 131; an electrophoretic element 135 formed between the partition walls 133; and an upper substrate 141 formed at an upper portion of the partition wall 133 containing the electrophoretic element 135 and formed with a common electrode 143 on the rear surface thereof.

Here, a passivation layer 115 is formed on an entire surface including the thin-film transistor (T) of the lower substrate 101.

Furthermore, the lower substrate 101 may be formed with a flexible material or metal material such as glass, plastic, and the like, and the common electrode 143 is formed with a transparent material such as indium tin oxide (ITO), indium zinc oxide (IZO), and the like. When a particular voltage is applied to the pixel electrode 121, color particles 135a and black particles 135b contained in the electrophoretic element 135 are moved to implement an image through the upper substrate 141, and therefore, the common electrode 143 formed on the upper substrate 141 should be formed with a transparent material.

In addition, a gate line (not shown) transmitting a scan signal and data line (not shown) transmitting an image data signal to drive a plurality of thin-film transistors (T) in an active manner are formed on the lower substrate 101.

Furthermore, a TFT common electrode 103b, a gate pad 103c, and a data pad 113c are formed on the lower substrate 101. At this time, the TFT common electrode 103b and the gate pad 103c are formed at the time of forming the gate line (not shown), and the data pad 113c is formed at the time of forming the data line (not shown).

In addition, the gate and data lines intersect each other to define pixels, and each pixel is provided with thin-film transistors (T) and a storage capacitor (not shown), thereby performing a role of controlling a polarity of the voltage applied to each electrode and storing potential energy applied to the polarity.

Furthermore, though not shown in the drawing, the storage capacitor (Cst) is composed of a capacitor lower electrode and a capacitor upper electrode, which is overlapped with the capacitor lower electrode by interposing a gate insulation film therebetween, and thus a charged potential is maintained in the electrophoretic film during the turn-off section of the thin-film transistor (T) when displaying an image, thereby performing a role of preventing a reduced image quality caused by parasitic capacity. At this time, the capacitor lower electrode is extended to an outside of the active region to receive a signal, and the capacitor upper electrode is connected to the pixel electrode or drain electrode to receive a signal.

In addition, the side electrode 131 is an electrode that is used to prevent charged color particles 135a from being color mixed with an adjacent dot at the time of injecting a fluid contained in the electrophoretic element 135. In other words, when a relative voltage is applied to the side electrode 131 and pixel electrode 121, particles are concentrated on a side of the electrode to prevent the color mix of particles at the time of filling a fluid. Here, the side electrode 131 is formed of molybdenum (Mo) or other conductive materials. Furthermore, the side electrode 131 is used to prevent the color mix of particles at the time of filling a fluid or used to refresh at the time of driving.

In addition, the light blocking pattern 129 may be formed together at the time of forming the side electrode 131, or may be formed separately.

Furthermore, the common electrode 143 formed on the upper substrate 141 is formed with an adhesive layer 145 to be adhered to the partition wall (referring to FIG. 4, the adhesive layer 145 is adhered to the partition wall 133, rather than the side electrode 131) through the adhesive layer 145.

And, the adhesive layer 145 can be formed on a portion of the common electrode 143 corresponding to the partition wall 133.

In addition, the partition wall 133 is formed with a negative photoresist (PR) film or dry film (DFR) using a photolithographic process, or using a roll printing method.

Moreover, the electrophoretic element 135 is composed of color particles 135a, black particles 135b, and a fluid. Here, the electrophoretic element 135 composed of color particles 135a and black particles 135b has been described, but an electrophoretic element 135 composed of black particles and white particles may be used to be applied to a mono EPD panel.

On the other hand, for the dropping of the solvent including the white particles and color particles, a relative electric field is applied to the side electrode 131 and pixel electrode 121 to prevent a mixing in each cell, thereby allowing the color particles 135a and black particles 135b to be concentrated on the side electrode 131 and allowing a solvent to be filled therein.

A method of fabricating an electrophoretic display device having the foregoing construction according to the present invention will be described with reference to FIGS. 5A through 5H.

FIGS. 5A through 5H are process cross-sectional views for explaining a method of fabricating an electrophoretic display device according to the present invention.

Figure 5A:
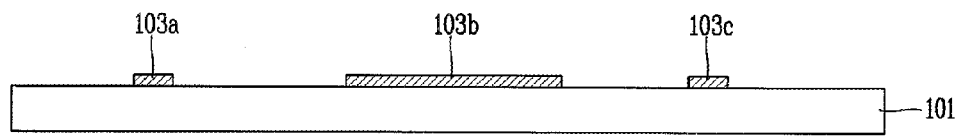
FIGS. 5A through 5H are process cross-sectional views for explaining a method of fabricating an electrophoretic display device according to the present invention.

As illustrated in FIG. 5A, a metal film (not shown) is deposited on a lower substrate 101 made of plastic or stainless foil and then the metal film (not shown) is selectively patterned using a photolithographic process and an etching process to form a gate line (not shown), a gate electrode 103 branched from the gate line (not shown), a TFT common electrode 103b, and a gate pad 103c.

At this time, the metal film materials are used by selecting any one of Al-based metals such as Al, an Al alloy, and the like, Ag-based metals such as Ag, an Ag alloy, and the like, Mo-based metals such as Mo, a Mo alloy, and the like, Cr, Ti, and Ta.

Furthermore, those materials may include two films having different physical properties, such as a lower film and an upper film thereon. Here, the upper film is made of a metal having a low resistivity, for example, an Al-based metal or Ag-based metal to reduce the signal delay or voltage drop of the gate line.

On the contrary, the lower film is made of a material having excellent physical, chemical, and electrical contact characteristics with another material, in particular, indium tin oxide (ITO) or indium zinc oxide (IZO), for example, Ti, Ta, Cr, Mo-based metals, and the like. An example of the combination of the lower and upper films may include Cr and an Al—Nd alloy.

Figure 5B:
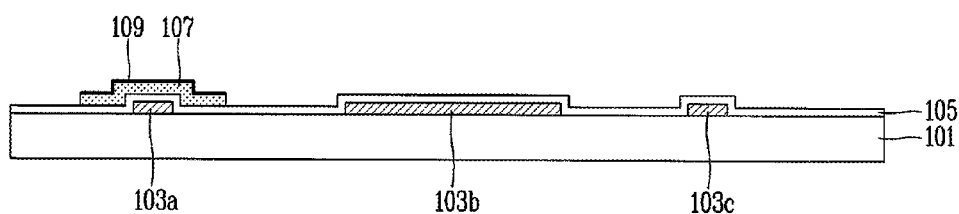

Subsequently, as illustrated in FIG. 5B, a gate insulating film 105 made of an inorganic insulating material, such as silicon nitride (SiNx) or silicon oxide (SiOx), is formed on the lower substrate 101 including the gate line (not shown) and gate electrode 103.

Then, though not shown in the drawing, a semiconductor layer (not shown) made of hydrogenated amorphous silicon layer or the like, and an impurity layer (not shown) made of a material such as n+ hydrogenated amorphous silicon in which silicide or n-type impurities are doped at high concentration are sequentially formed at an upper portion of the gate insulating film 105.

Subsequently, the impurity layer (not shown) and semiconductor layer (not shown) are selectively patterned using a photolithographic process and an etching process to form an active layer 107 and an ohmic contact layer 109.

Figure 5C:
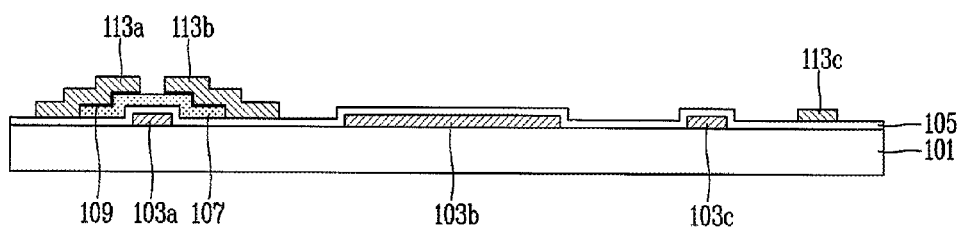

Then, as illustrated in FIG. 5C, a metal material for forming the data line is deposited on the lower substrate 101 including the active layer 107 and ohmic contact layer 109 using a sputtering method, and then selectively patterned using a photolithographic process and an etching process to form a data line (not shown), a source electrode 113a branched from the data line (not shown), a drain electrode 113b separated from the source electrode 113a by a channel region, and a data pad 113c, respectively.

At this time, a material such as an Al-based metal, an Ag-based metal, a Mo-based metal, Cr, Ti, Ta, and the like, may be used as the metal material, or it may be formed with a multiple layer.

Furthermore, the data line (not shown) is formed by intersecting with the gate line (not shown), and the source electrode 113a and drain electrode 113b together with an active layer 107 and a gate electrode 103 thereunder constitutes a switching element, thin-film transistor (T).

In addition, though not shown in the drawing, a channel of the thin-film transistor (T) is formed within an active layer 107 between the source electrode 113a and drain electrode 113b. At this time, a process of forming the active layer 107 and ohmic contact layer 109, and the source electrode 113a and drain electrode 113b may be implemented through one mask process (i.e., thin-film transistor fabrication process using 4-mask process).

Subsequently, a passivation layer 115 is formed on an entire surface of the lower substrate 101 including the data line (not shown) and source/drain electrodes 113a and 113b. At this time, the passivation layer 115 is formed of an inorganic insulating material, such as silicon nitride film (SiNx) or silicon oxide film (SiOx), or organic insulating material to perform a planarization process. In addition, a single structure composed of an organic insulating body, or a manifold structure such as inorganic/organic insulating body, inorganic/organic/inorganic insulating body, and the like may be applicable to the passivation layer 115.

Figure 5D:
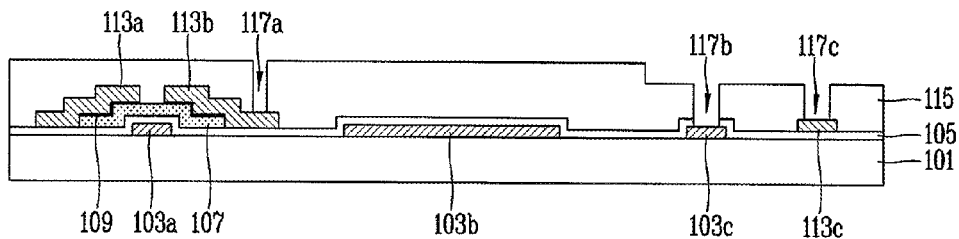

Then, as illustrated in FIG. 5D, the passivation layer 115 is selectively patterned through a photolithographic process and an etching process to form first, second, third contact holes 117a, 117b and 117c for exposing a portion of the drain electrode 113b, gate pad 103c, and data pad 113c of the thin-film transistor (T).

Figure 5E:
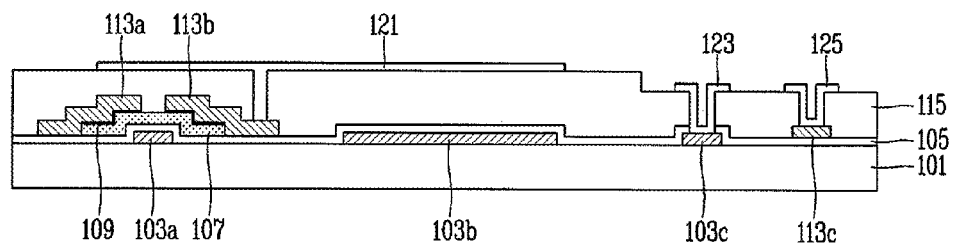

Then, as illustrated in FIG. 5E, a metal material layer (not shown) made of a transparent material such as indium tin oxide (ITO), indium zinc oxide (IZO), and the like is deposited on the passivation layer 115 including the first, second, third contact holes 117a, 117b and 117c.

Then, the metal material layer (not shown) is selectively removed using a photolithographic or etching process to form a pixel electrode 121, an upper gate pad 123, and an upper data pad 125 connected to the drain electrode 113b, gate pad 103c, and data pad 113c, respectively.

Subsequently, a conductive material layer (not shown) is deposited on an entire surface of the substrate including the pixel electrode 121, upper gate pad 123, and upper data pad 125, and then an insulating material layer for forming a partition wall (not shown) is deposited on the conductive material layer (not shown). At this time, a material such as an Al-based metal, an Ag-based metal, a Mo-based metal, Cr, Ti, Ta, and the like may be used for the conductive material layer (not shown), or a multi layer may be formed therefor. Furthermore, any one of negative photosensitive resin, dry film, acrylic resin, polymer, and sealant may be used for the partition wall forming insulating material layer (not shown).

Figure 5F:
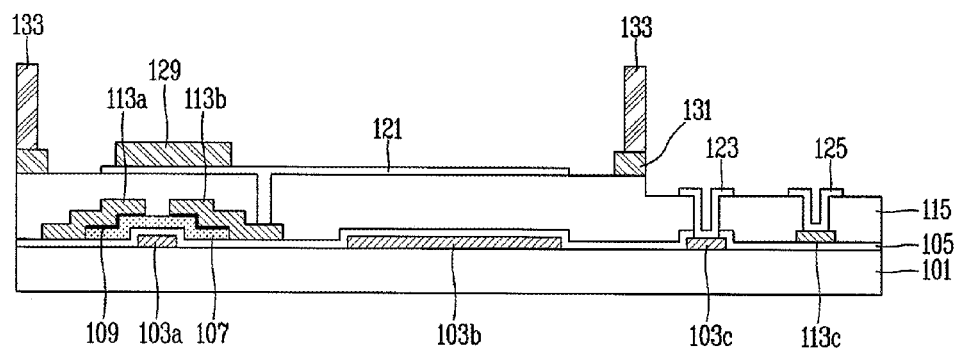

Next, as illustrated in FIG. 5F, the insulating material layer for forming the partition wall (not shown) is selectively removed through a photolithographic and an etching process to form a partition wall 133. At this time, the partition wall 133 performs a role of partitioning a thin-film transistor (T) and a cell region formed with a pixel electrode 121, respectively. In addition, a region partitioned by the partition wall 133 is filled with the electrophoretic element (not shown) in the following process. At this time, the partition wall 133 may be formed by using a roll printing method in addition to a photo method.

Subsequently, using the partition wall 133 as an isolation film, the conductive material layer (not shown) on the entire surface of the substrate including the pixel electrode 121, upper gate pad 123, and upper data pad 125 is selectively removed through a wet etching process to form a light blocking pattern 129 on the pixel electrode 121 at an upper portion of the thin-film transistor (T), and the side electrodes 131 at a periphery of the pixel electrode 121. At this time, the side electrode 131 performs a role of preventing charged color particles from being color mixed with an adjacent dot at the time of injecting a fluid. In other words, when a relative voltage is applied to the side electrode 131 and pixel electrode 121, thereby allowing particles to be concentrated on the side electrode 131 to prevent the color mix of particles at the time of filling a fluid. Furthermore, the side electrode 131 is used to prevent the color mix of particles at the time of filling a fluid or used to refresh at the time of driving.

Figure 5G:
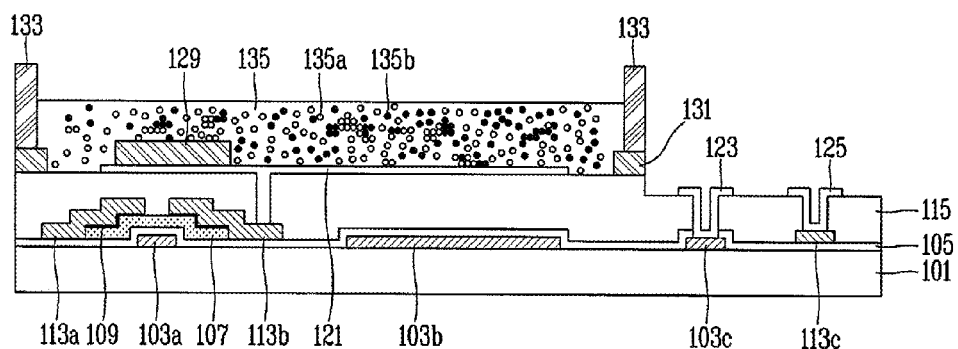

Then, as illustrated in FIG. 5G, an electrophoretic element 135 composed of negative polarity color particles 135a, positive polarity black particles 135b, and a fluid are filled within the lower substrate 101 formed with the partition wall 133. At this time, any one of die coating, casting, bar coating, dispense, squeezing, inkjet printing, and screen printing processes may be used for a method of filling the electrophoretic element 135. Furthermore, when a particular voltage is applied to the pixel electrode 121, color particles 135a and black particles 135b contained within the electrophoretic element 135 are moved to implement a color image through the upper substrate 141.

Figure 5H:
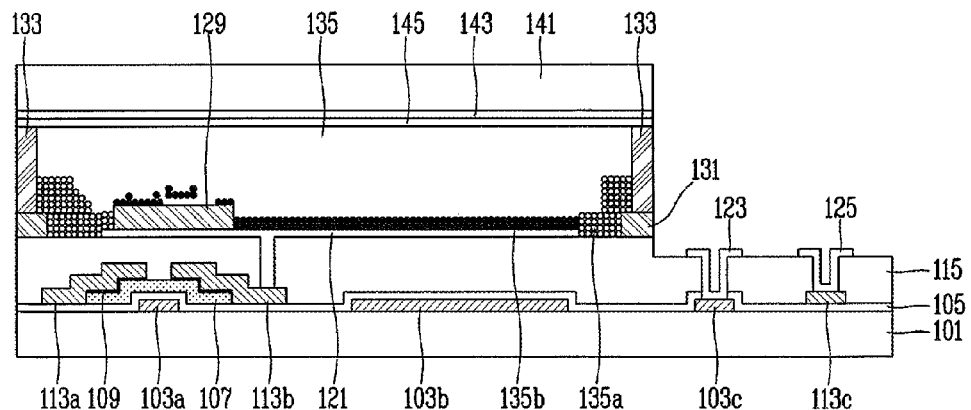

Subsequently, as illustrated in FIG. 5H, a common electrode 143 composed of a transparent material is formed on the upper substrate 141 composed of a polyester (PET) material, and then an adhesive layer 145 is laminated thereon.

Then, the upper substrate 141 formed with the common electrode 143 is adhered on the lower substrate 101 filled with the electrophoretic element 135 by an adhesive layer 145 to encapsulate the electrophoretic element 135, thereby finishing fabrication of the electrophoretic display device.

In this manner, when a negative voltage is applied to the pixel electrode 121, the common electrode 143 of the upper substrate 141 has a relatively positive potential. Accordingly, negatively charged black particles 135b are moved to the common electrode 143, while positively charged white particles 135a are moved to the pixel electrode 121. As a result, when external light is illuminated on the electrophoretic display device, the external incident light is absorbed by the black particles 135b to implement black.

Figure 6:
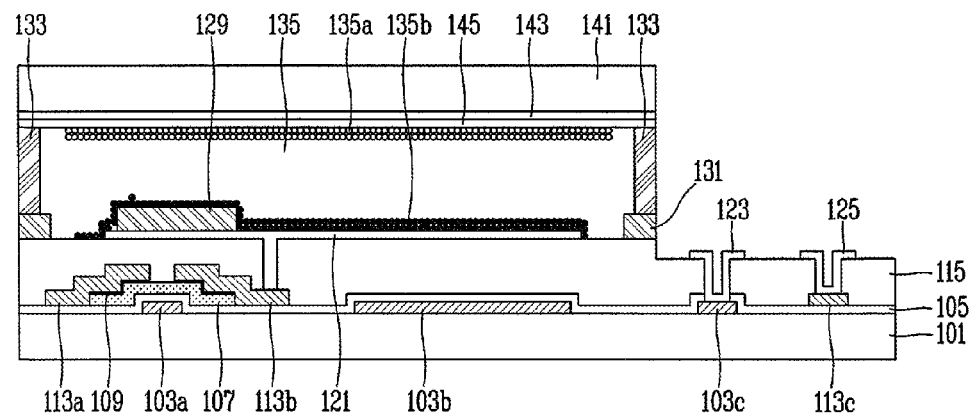
FIG. 6 is a cross-sectional view schematically illustrating a state of moving particles when implementing colors in an electrophoretic display device according to the present invention.

FIG. 6 is a cross-sectional view schematically illustrating a state of moving particles when implementing colors in an electrophoretic display device according to the present invention.

On the contrary, as illustrated in FIG. 6, when a positive voltage is applied to the pixel electrode 121 provided in the each pixel region, the common electrode 143 of the upper substrate 141 has a relatively negative potential. Accordingly, negatively charged black particles 135b are moved to the pixel electrode 121, while positively charged white particles 135a are moved to the common electrode 143 of the upper substrate 141.

As a result, when external light is illuminated on the electrophoretic display device, the external incident light is reflected by the color particles 135a to implement a color (for example, red).

Figure 7:
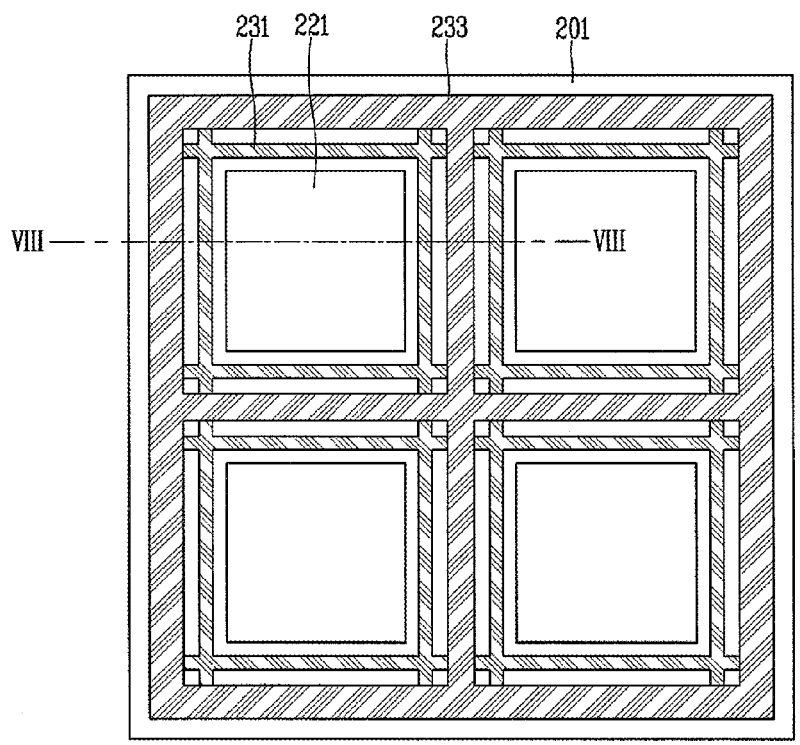
FIG. 7 is a plan view schematically illustrating an electrophoretic display device according to another embodiment of the present invention.

FIG. 7 is a plan view schematically illustrating an electrophoretic display device according to another embodiment of the present invention.

An electrophoretic display device according to another embodiment of the present invention, as illustrated in FIG. 7, one pixel is composed of four sub-pixels. Here, each of the sub-pixels has a thin-film transistor (not shown), and this thin-film transistor (not shown) is connected to a pixel electrode (221) in a matrix form.

Figure 8:
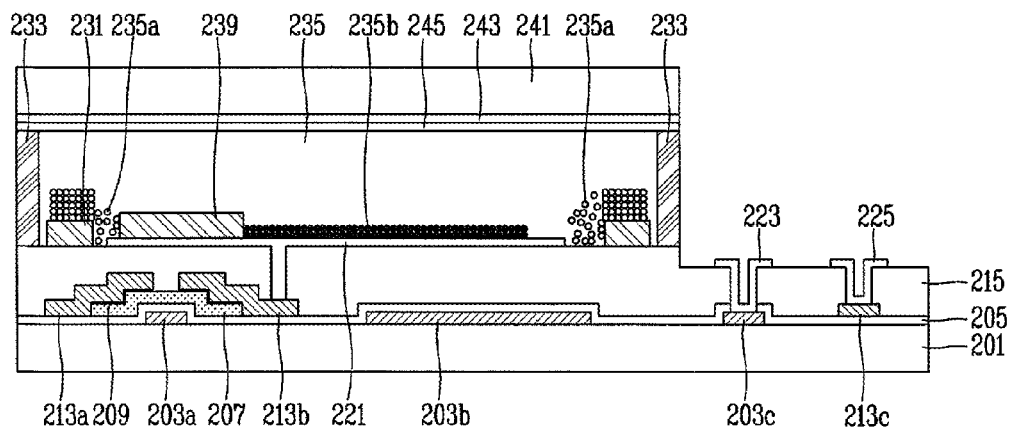
FIG. 8 is a cross-sectional view schematically illustrating an electrophoretic display device according to another embodiment of the present invention.

FIG. 8 is a cross-sectional view schematically illustrating an electrophoretic display device according to another embodiment of the present invention.

An electrophoretic display device according to another embodiment of the present invention, as illustrated in FIG. 8, may include a thin-film transistor (T) formed on a lower substrate 201; a pixel electrode 221 connected to the thin-film transistor (T); a light blocking pattern 239 protecting the thin-film transistor from the light irradiated from the outside, and formed on the pixel electrode 221 of the lower substrate 201; side electrodes 231 formed between the pixel electrode 221 and a partition wall 233; the partition wall 233 formed at a periphery of the side electrode 231; an electrophoretic element 235 formed between the partition walls 233; and an upper substrate 241 formed at an upper portion of the partition wall 233 containing the electrophoretic element 235 and formed with a common electrode 243 on the rear surface thereof.

Here, a passivation layer 215 is formed on an entire surface including the thin-film transistor (T) of the lower substrate 201.

Furthermore, the lower substrate 201 may be formed with a flexible material or metal material such as glass, plastic, and the like, and the common electrode 243 is formed with a transparent material such as indium tin oxide (ITO), indium zinc oxide (IZO), and the like. When a particular voltage is applied to the pixel electrode 221, color particles 235a and black particles 235b contained in the electrophoretic element 235 are moved to implement an image through the upper substrate 241, and therefore, the common electrode 243 formed on the upper substrate 241 should be formed with a transparent material.

In addition, a gate line (not shown) transmitting a scan signal and data line (not shown) transmitting an image data signal to drive a plurality of thin-film transistors (T) in an active manner are formed on the lower substrate 201.

Furthermore, a TFT common electrode 203b, a gate pad 203c, and a data pad 213c are formed on the lower substrate 201. At this time, the TFT common electrode 203b and the gate pad 203c are formed at the time of forming the gate line (not shown), and the data pad 213c is formed at the time of forming the data line (not shown).

In addition, the gate and data lines intersect each other to define pixels, and each pixel is provided with thin-film transistors (T) and a storage capacitor (not shown), thereby performing a role of controlling a polarity of the voltage applied to each electrode and storing potential energy applied to the polarity.

Furthermore, though not shown in the drawing, the storage capacitor (Cst) is composed of a capacitor lower electrode and a capacitor upper electrode, which is overlapped with the capacitor lower electrode by interposing a gate insulation film therebetween, and thus a charged potential is maintained in the electrophoretic film during the turn-off section of the thin-film transistor (T) when displaying an image, thereby performing a role of preventing a reduced image quality caused by parasitic capacity. At this time, the capacitor lower electrode is extended to an outside of the active region to receive a signal, and the capacitor upper electrode is connected to the pixel electrode or drain electrode to receive a signal.

In addition, the side electrode 231 is an electrode that is used to prevent charged color particles 235a from being color mixed with an adjacent dot at the time of injecting a fluid contained in the electrophoretic element 235. In other words, when a relative voltage is applied to the side electrode 231 and pixel electrode 221, particles are concentrated on a side of the electrode to prevent the color mix of particles at the time of filling a fluid. Here, the side electrode 231 is formed of molybdenum (Mo) or other conductive materials. Furthermore, the side electrode 231 is used to prevent the color mix of particles at the time of filling a fluid or used to refresh at the time of driving.

In addition, the light blocking pattern 239 may be formed together at the time of forming the side electrode 231, or may be formed separately.

Furthermore, the common electrode 243 formed on the upper substrate 241 is formed with an adhesive layer 245 to be adhered to the partition wall (referring to FIG. 8, the adhesive layer 245 is adhered to the partition wall 233, rather than the side electrode 231) through the adhesive layer 245.

And, the adhesive layer 245 can be formed on a portion of the common electrode 243 corresponding to the partition wall 233.

In addition, the partition wall 233 is formed with a negative photoresist (PR) film or dry film (DFR) using a photolithographic process, or using a roll printing method.

Moreover, the electrophoretic element 235 is composed of color particles 235a, black particles 235b, and a fluid. Here, the electrophoretic element 235 composed of color particles 235a and black particles 235b has been described, but an electrophoretic element 235 composed of black particles and white particles may be used to be applied to a mono EPD panel.

On the other hand, for the dropping of the solvent including the white particles and color particles, a relative electric field is applied to the side electrode 231 and pixel electrode 221 to prevent a mixing in each cell, thereby allowing the color particles 235a and black particles 235b to be concentrated on the side electrode 231 and allowing a solvent to be filled therein.

As described above, according to an electrophoretic display device and a fabrication method thereof, charged color particles and a fluid are injected into a cell region in the partition wall provided on a thin-film transistor, and then the upper portion thereof is encapsulated to fabricate an electrophoretic display device.

Furthermore, according to an electrophoretic display device and a fabrication method thereof, a partition wall is formed on a thin-film transistor, and negatively charged color particles and positively charged black particles are injected into red, green, blue cells, respectively, using an inkjet or other methods, and then in-capsulated on an upper substrate formed with a transparent common electrode while at the same time injecting a suitable amount of dropping fluid in a state that a relative electric field is applied to the side electrode and the pixel electrode to prevent mixed color.

In addition, according to an electrophoretic display device and a fabrication method thereof, color drive is possible through a vertical drive by the common electrode formed on the upper substrate in-capsulated with a pixel electrode of the thin-film transistor.

As a result, according to an electrophoretic display device and a fabrication method thereof, it is expected to preoccupy the color EPD technology and market by securing the technology of fabricating a light-weight, thin-profile color EPD panel, which has the characteristics of color EPD panel and cost competitiveness.

Although the present invention has been described with reference to preferred embodiments thereof, it should be understood by those skilled in the art that various modifications and equivalent other embodiments of the present invention can be made.

Accordingly, the present invention is not limited to those embodiments, and various modifications and improvements made by using basic concepts of the present invention defined in the appended claims will fall into the right scope of the present invention.

What is claimed is:

1. An electrophoretic display device, the device comprising:
   thin-film transistors (TFTs) formed in a matrix form on a lower substrate having a pixel region in which are arranged unit pixel regions;
   a passivation layer covering the lower substrate on which is formed the thin-film transistors;
   pixel electrodes formed on the passivation layer and connected to the thin-film transistors, respectively;
   a TFT blocking pattern formed on the pixel electrode at an upper portion of each of the thin-film transistors (TFTs);
   a side electrode formed on the passivation layer and enclosing the pixel electrodes and spaced with the pixel electrodes, wherein the side electrode is formed in one body on the passivation layer;
   a partition wall between the pixel electrodes and dividing the pixel region into the unit pixel region;
   a fluid including an electrophoretic particles filled between the partition wall; and
   an upper substrate attached with the lower substrate and formed with a common electrode on a lower surface thereof,
   wherein the TFT blocking pattern and the side electrode are formed of the same conductive metal material.

2. The device of claim 1, the partition wall is formed on the side electrode.

3. The device of claim 1, the side electrode is formed at between the pixel electrode and the partition wall.

4. The device of claim 1, wherein the side electrodes are formed by selecting any one of Al-based metals including Al and Al alloy, Ag-based metals including Ag and Ag alloy, Mo-based metals including Mo and Mo alloy, Cr, Ti, and Ta.

5. The device of claim 1, wherein the partition wall is formed by using any one of negative photosensitive resin, dry film, acrylic resin, polymer, and sealant.

6. The device of claim 1, wherein the side electrode is used for preventing a mixture of particles in implanting fluid or for refresh in driving.

7. The device of claim 1, wherein the electrophoretic particles are composed of color particles, white particles, or composed of white particles, black particles.

8. A method of fabricating an electrophoretic display device, the method comprising:
   forming thin-film transistors in a matrix form on a lower substrate having a pixel region in which are arranged unit pixel regions;
   forming a passivation layer covering the thin-film transistors;
   forming pixel electrodes on the passivation layer and connected to the thin-film transistors, respectively;
   forming a TFT blocking pattern on the pixel electrode at an upper portion of each of the thin-film transistors (TFTs);
   forming a side electrode on the passivation layer and enclosing the pixel electrodes and spaced with the pixel electrodes, wherein the side electrode is formed in one body on the passivation layer;
   forming a partition wall dividing the pixel region into the unit pixel regions and formed at between the pixel electrodes on the passivation layer;
   filling a fluid including electrophoretic particles between the partition wall; and
   attaching an upper substrate on the lower substrate, the upper substrate is provided with a common electrode on a lower surface thereof,
   wherein the TFT blocking pattern and the side electrode are comprised of the same conductive metal layer, and the TFT blocking pattern and the side electrode are simultaneously formed.

9. The method of claim 8, wherein the partition wall is formed on the side electrode.

10. The method of claim 8, the partition wall is formed at peripheral of the side electrode and on the passivation layer.

11. The method of claim 8, wherein the side electrode is formed by selecting any one of Al-based metals including Al, an Al alloy, Ag-based metals including Ag, an Ag alloy, Mo-based metals including Mo, a Mo alloy, Cr, Ti, and Ta.

12. The method of claim 8, wherein the partition wall is formed by using any one of negative photosensitive resin, dry film, acrylic resin, polymer, and sealant.

13. The method of claim 8, wherein the side electrode is used for preventing a mixture of particles in implanting fluid or for refresh in driving.

14. The method of claim 8, wherein the electrophoretic particles are composed of color particles, white particles or composed of white particles, black particles.

15. The method of claim 8, wherein the partition walls are formed using a photolithographic process or roll printing method.

16. The method of claim 8, wherein the fluid is filled by using any one of die coating, casting, bar coating, dispense, squeezing, inkjet printing, and screen printing processes.

* * * * *